March 20, 1951 — M. J. MANJOINE ET AL — 2,545,482
TESTING MACHINE FOR DETERMINING THE MECHANICAL
BEHAVIOR OF METALS UNDER TEST
Filed May 27, 1944
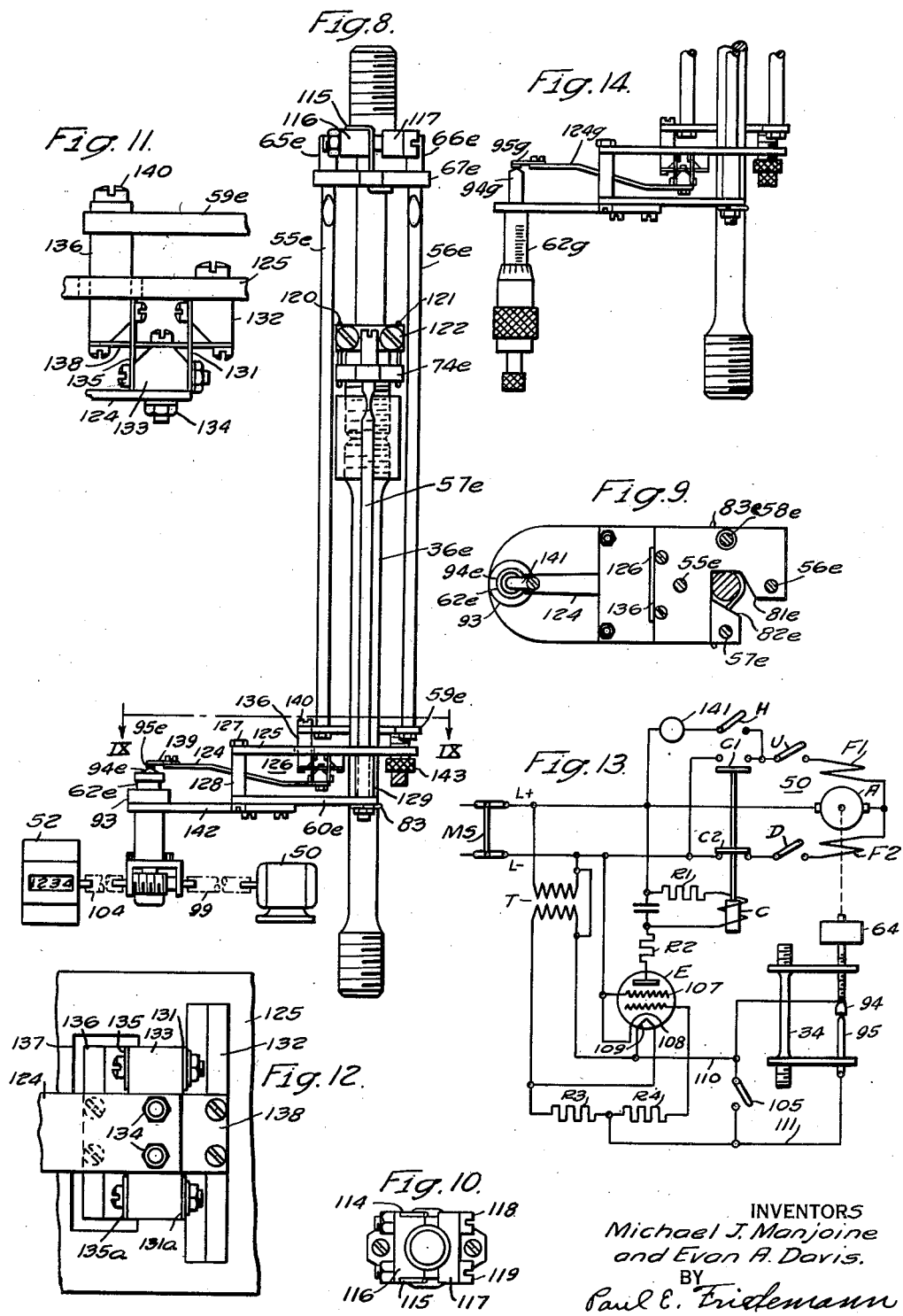
INVENTORS
Michael J. Manjoine
and Evan A. Davis.
BY
Paul E. Friedemann
ATTORNEY Patented Mar. 20, 1951

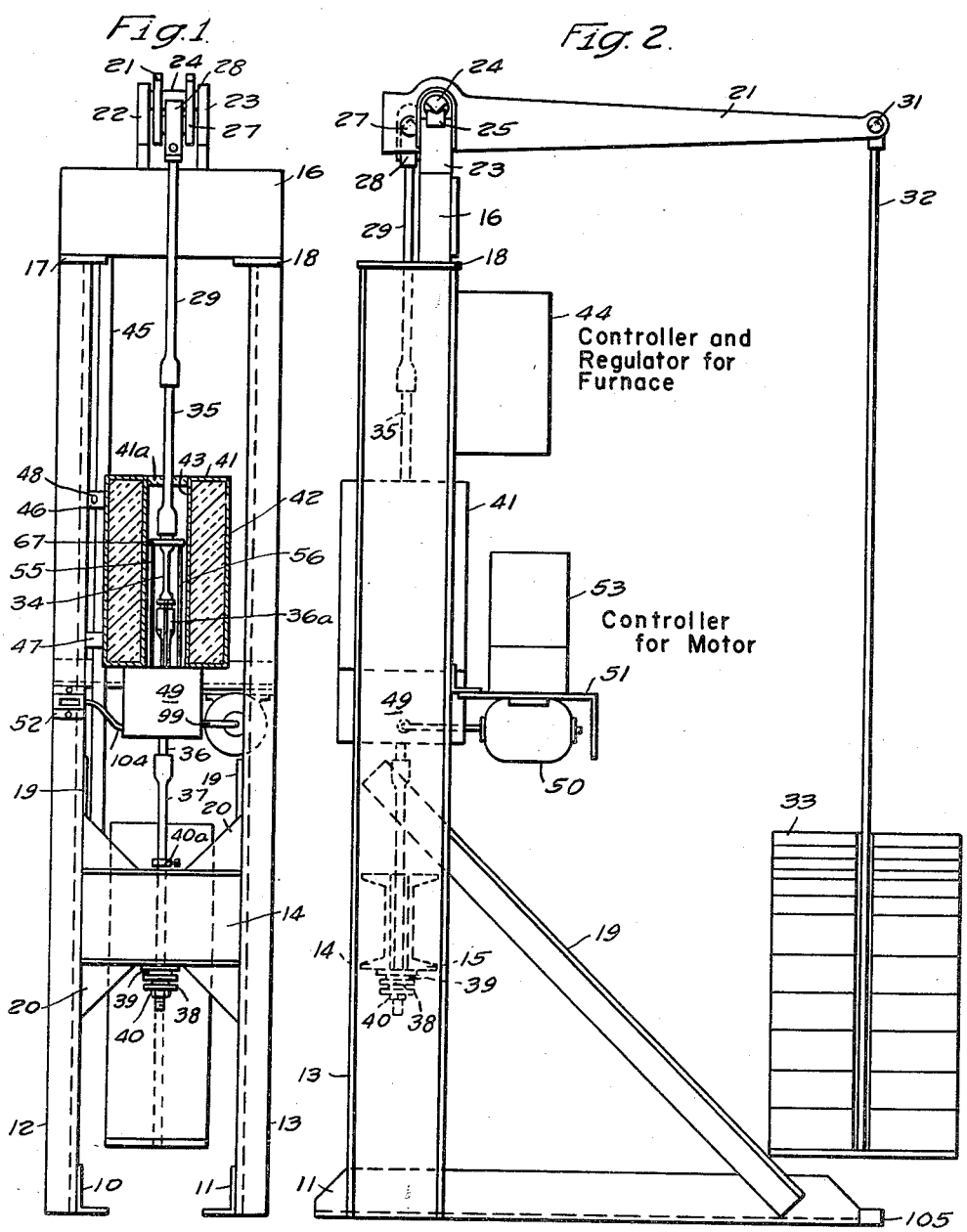

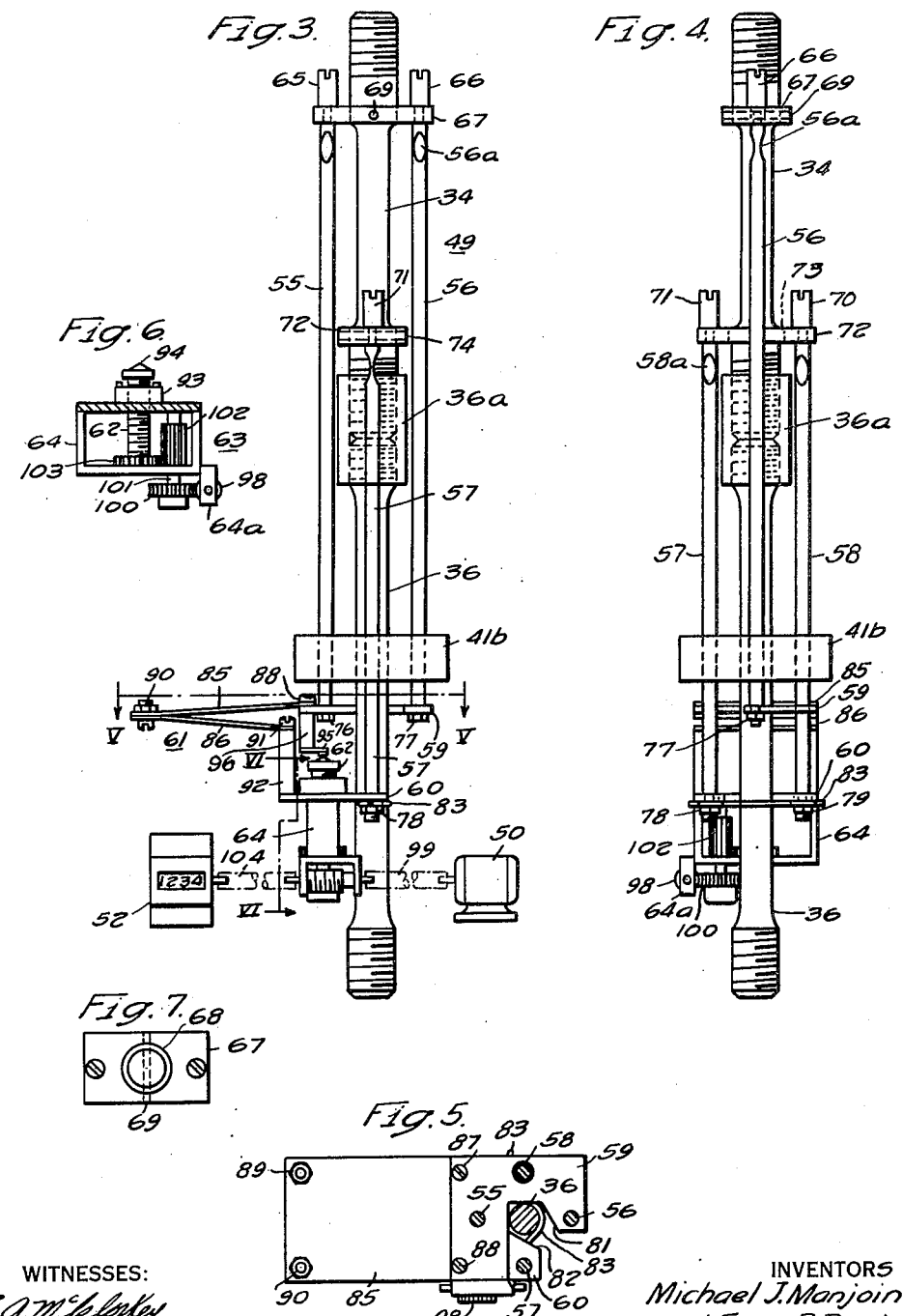

2,545,482

UNITED STATES PATENT OFFICE 2,545,482

TESTING MACHINE FOR DETERMINING THE MECHANICAL BEHAVIOR OF METALS UNDER TEST

Michael J. Manjoine, Pittsburgh, and Evan A. Davis, Forest Hills, Pa., assignors to Westinghouse Electric Corporation, East Pittsburgh, Pa., a corporation of Pennsylvania Application May 27, 1944, Serial No. 537,721

6 Claims. (Cl. 33—147)

Our invention relates to metal testing machines, and more particularly to machines of this character for determining the mechanical behavior of a metal or metal alloys under given stresses and at given high temperatures, including their creep or plastic extension and fracture as a result of the stresses and the high temperatures.

One object of our invention is to provide a machine for testing specimens of metal or metal alloys in tension at a constant temperature and under a constant load, and to accurately record the extensions of the specimen.

Another object is to provide a machine of the character indicated which shall be simple and inexpensive in construction and operation, and which will occupy a small floor space.

Another object is to provide a testing machine which may be readily adapted for use in the sorting of metal alloys, the checking of heat treatments of metal alloys, the making of quality tests for checking several melts of a metal alloy and the making of rupture tests on a particular metal alloy.

A further object of the invention is to provide a simple testing apparatus which may be quickly and easily attached to the specimen to be tested and which will be accurate and reliable in providing a visual indication of the extension of the test specimen.

It is also an object of our invention to provide a testing apparatus in which the extensometer may be operated automatically by an electric motor or which may be controlled by a manual device, such as by a micrometer.

Other objects will be obvious from the following description of the invention taken in conjunction with the accompanying drawings, in which:

Figure 1 is a view in front elevation of a testing machine embodying our invention, Fig. 2 is a view in side elevation of the machine illustrated in Fig. 1, Fig. 3 is an enlarged view in front elevation of the extensometer embodied in the machine illustrated in Fig. 1, Fig. 4 is a view in side elevation of the extensometer shown in Fig. 3, Fig. 5 is a view taken on the line V—V of Fig. 3, Fig. 6 is a view in side elevation of the reducing gear between the motor and the micrometer device in Fig. 3, Fig. 7 is a top plan view of the top attaching plate on the upper comparison rods illustrated in Fig. 3;

Fig. 8 is a view in front elevation of a modified form of the extensometer illustrated in Fig. 3;

Fig. 9 is a view taken on the line IX—IX of Fig. 8;

Fig. 10 is a top plan view of the clamp for attaching the upper ends of the upper comparison rods to the specimen illustrated in Fig. 8;

Fig. 11 is an enlarged view in side elevation of the spring mounting of the magnifying lever forming a part of Fig. 8;

Fig. 12 is a bottom plan view of the lever mounting illustrated in Fig. 11;

Fig. 13 is a diagrammatic representation of the circuits for the motor in Fig. 1 and the circuits controlled by the extensometer contacts for controlling the motor; and Fig. 14 is a view in front elevation of the extensometer illustrated in Fig. 8 with a manually-operated micrometer substituted for the motor operated micrometer illustrated in Fig. 8.

Referring more particularly to the drawings, we have illustrated a testing machine having an upright rectangular like frame comprising a pair of base angle irons 10 and 11, a pair of channel irons 12 and 13 vertically disposed on the base angle irons and securely welded thereto, a pair of cross bars 14 and 15 having their ends securely welded to the channel irons, and a top bar 16 disposed on the plates 17 and 18 mounted on the upper ends of the channel irons and securely welded thereto, and a pair of brace angle irons 19 extending from the rear ends of the base angle irons to the sides of the channel irons 12 and 13. A plurality of gussets 20 are welded in the corners where the cross channel irons 14 and 15 meet the channel irons 12 and 13 for bracing the frame and giving it additional strength. These parts should be made out of very heavy material with reference to the range of dimension of the test specimen to be tested so that there will be very little distortion.

A horizontal lever arm 21 for applying a load to the specimen is pivotally supported by means of a fulcrum bar 24, in a pair of brackets 22 and 23 mounted on the cross bar 16. The outer ends of the fulcrum bar are provided with knife edges disposed to rest in hardened steel seats 25 set in the brackets 22 and 23. The lever 21 has a bifurcated head in which is a cross bar 27 having a knife edge on its upper surface for pivotally supporting a yoke 28 to which a loading bar 29 is attached.

The arm of the lever extends rearwardly and is connected by a knife edge pivotal joint 31 to a weight rod 32 on the lower end of which a plurality of weights 33 may be suspended for applying any desired load to the specimen.

The means for mounting a test specimen such as is indicated by the bar 34 in the machine, when it is desired to make a test, comprises an upper specimen grip 35 and a lower specimen grip or anchor 36. The upper end of the grip 35 is provided with a screw thread so that it may be screwed into the lower end of the loading bar 29.

The lower end of the grip 35 is provided with a screw threaded recess into which the upper end of the test specimen may be screwed. The lower grip 36 is provided at its upper end with a screw threaded coupling 36a which may be screwed on the lower end of the test specimen. The lower end of the grip 36 is screw threaded so that the upper end of an anchor bar 37 may be screwed thereon. The lower end of the anchor bar passes downwardly between the cross channel irons 14 and 15 and is prevented from withdrawal therefrom by a spherical seat 38, the upper face of which bears against a thrust ball bearing 39. A nut 40 is used to tighten the anchor 37 in position for a test operation. The spherical seat connection permits the lever arm to make a direct pull on the test specimen when a test is being made. A collar 40a having a set screw is disposed on the anchor bar above the cross bars 14 and 15 to prevent the anchor bar from falling down when the specimen fractures.

An electric furnace 41 is provided for heating the test specimen to any desired test temperature. The furnace is constructed with a cylindrical outer housing 42 and an inner housing 43 and may be provided with suitable heating windings (not shown) disposed in suitable insulating material adjacent to the inner housing for heating the test specimen.

A suitable controller and regulator unit 44 is mounted on the channel iron 13 for connecting the furnace to a suitable source of energy and for maintaining the temperature in the furnace constantly at any selected value.

The furnace is slidably mounted on a square rod 45 by means of a pair of brackets 46 and 47 and it may be locked at any height on the rod by means of a tightening nut 48 on the bracket 46. The square rod may be mounted on the channel iron 12 in any suitable manner in such position that the furnace may be raised above the test specimen and be locked in such position by tightening the nut 48 on the bracket 46.

Inasmuch as these furnaces are old and well known, no further description thereof will be given.

An extensometer 49 is attached to the test specimen 34 for measuring its deformation while it is under test. The extensometer is provided with an operating motor 50 mounted on a bracket 51 attached to the channel iron 13 and with an indicating or recording mechanism such as a counting meter 52 mounted on the channel iron 12. The motor is electrically connected with the extensometer through a controller 53 mounted above the motor on the bracket 51.

Referring more particularly to Figs. 3 and 4 which illustrate the form of our testing apparatus particularly suitable for making creep-to-rupture tests, the extensometer 49 comprises a pair of upper comparison rods 55 and 56, a pair of lower comparison rods 57 and 58, an upper frame plate 59, a lower frame plate 60, a positioning spring 61, a micrometer 62, and a gear reducing mechanism 63 mounted in a frame 64 attached to the lower plate 60.

The upper ends of the upper comparison rods are attached by a pair of cap screws 65 and 66 to a plate 67, which has a centrally disposed hole 68 for receiving the test piece and which is provided with a screw or pin 69 which passes through the sides of the plate and through the specimen thereby coupling the comparison rods to the upper end of the specimen, so that they will move with that end of the specimen. Each of the comparison rods 55 and 56 is made of high temperature alloy and is provided with a cutaway portion 56a near its upper end to permit flexible movement if the specimen bends.

The lower comparison rods 57 and 58 are connected by a pair of cap screws 70 and 71 to a plate 72 having a centrally disposed hole for receiving the lower portion of the specimen 34 and having a pin 74 which passes through its sides and through the lower portion of the specimen thereby attaching the lower comparison rods to the lower portion of the test specimen so that they will move with it. Each of the lower comparison rods 57 and 58 is made of a high temperature alloy and is provided at its upper end with a cutaway or thinned portion 58a to permit it to have a limited flexible movement if the specimen bends.

The lower ends of the upper comparison rods are seated in the plate 59 and securely fastened thereto by a pair of nuts 76 and 77. The lower ends of the lower comparison rods 57 and 58 are likewise seated in the lower plate 60 and secured thereto by a pair of nuts 78 and 79. The plates 59 and 60 (Fig. 5) are provided with cutaway portions 81 and 82 to permit them to be moved into operating position adjacent the lower grip bar 36 when they are being mounted on the specimen and the grip bar. A stiff wire 83 may be bent around the grip 36 and back of the nuts 78 and 79 to hold the plates in their operating position and prevent them from swinging away from the specimen grip.

The spring 61 for connecting the plates 59 and 60 comprises an upper leaf 85 and lower leaf 86. The inner end of the leaf 85 is attached to the plate 59 by a pair of cap screws 87 and 88 and its outer end is firmly attached to the outer end of the leaf 86 by a pair of bolts 89 and 90. The inner end of the leaf 86 is attached to the plate 60 by a plurality of cap screws 91 on top of a pair of spacing sleeves 92. With this connection of the spring 61, it will permit relative vertical movement of the plates 59 and 60, but will maintain their vertical alinement at all times.

The micrometer 62 is mounted on the lower plate 60 by means of a block 93 in such position that a contact point 94 on its upper end will be in a position to engage a cooperating contact point 95 mounted and insulated by a nut and sleeve 96 on the under side of the upper plate 59.

The gear mechanism 63, for screwing the micrometer upwardly or downwardly, is provided with a worm 98, which is connected to the motor 50 by a flexible shaft 99, and which is disposed to mesh with a worm wheel 100 on a shaft 101 on which is mounted a wide gear wheel 102 in position to mesh with a gear wheel 103 fixed on the screw shaft of the micrometer 62. The width of the gear wheel 102 will permit the gear wheel 103 to move axially along it when the gear mechanism is operated to screw the micrometer, either up or down.

The revolution counting meter 52 is connected by a flexible shaft 104 to the other end of the worm wheel so that each revolution of the worm by the motor 50 will cause the meter to register a revolution.

With the construction described, when the test specimen starts to deform or elongate while under test, it moves the contact 95 away from the contact 94 and thereby starts the motor which rotates the worm and, therefore, the micrometer, until the contacts close and stop the motor. The operation of the worm shaft also operates the counting meter and thus the meter indicates the number of revolutions the worm makes in screwing the micrometer into engagement with the contact 95. Inasmuch as the rotation of the worm corresponds proportionally to the deformation or stretching of the specimen and the meter is operated by the worm, the meter will give a visual indication of the deformation or elongation of the specimen under test.

In the extensometer control system illustrated in Fig. 13, a pair of supply conductors L+ and L— are provided for operating the motor and the control relays associated therewith. A main switch MS may be used to connect the supply conductors L+ and L— to a suitable source of electrical energy. The motor 50 is a split field motor having an armature A and a pair of field windings F1 and F2. The supply conductors may be connected to the motor by a control relay C and by an up switch U or a down switch D. The relay C is provided with contacts C1 which may complete the circuit for up direction operation and with contacts C2 which may complete the circuit for down direction operation.

Inasmuch as the contacts on the micrometer part of the extensometer must operate on a very small pressure, they are connected to an amplifying tube E for controlling the energization and deenergization of the relay C. The amplifying tube receives its energy from the supply conductors L+ and L— through a transformer T and the contacts 94 and 95 are so connected in its circuits that they will cause the relay C to be deenergized and thus stop the motor when the contacts are closed, providing the up direction switch U is closed and the down direction switch D is open.

A normally open shut-off switch 105 is mounted beneath the weighted end of the lever arm and connected in a circuit around the contacts 94 and 95. If a specimen is being tested to rupture, when it breaks, the weighted end of the lever will fall on the switch 105 thereby closing it and stopping any further operation of the motor regardless of the condition of contacts 94 and 95.

Assumed operation

It is believed that a better understanding of the invention may be had by the following assumed operation of the apparatus described.

It will be assumed that a test specimen of, say, 0.505 inch diameter will be given a creep-to-rupture test at a constant temperature and a constant load.

It will be assumed that there is no test specimen in the machine, that the furnace 41 is in its uppermost position, that the weights 33 have been removed from the weight rod 32, and that the master switch MS is open. When the test specimen was removed from the machine, the extensometer used with it was also disconnected from the meter 52 and the motor 50 and moved out of the machine with the test specimen. In removing the test specimen from the machine, the lower grip bar 36 and the coupling 36a were also removed with it.

It will be assumed now that the lower end of the specimen to be tested is screwed into the coupling 36a, thereby connecting it firmly to the grip 36, and then that the specimen and the grip are inserted in the holes in the extensometer plates, a wire 83 bent around the lower grip and back of the nuts 78 and 79 and the pins 69 and 74 inserted in the plates 67 and 72 and through the test specimen, so that the upper comparison rods are pinned to the upper portion of the specimen, the lower comparison rods are pinned to the lower portion of the specimen, and the plate 60 is fastened to the grip 36.

Next the specimen and grip are inserted in the machine and the upper end of the specimen is screwed in to the upper grip 35. Next the anchor bar 37 is screwed on the lower end of the grip 36 and the nut 40 is tightened to place the test piece in its proper position so that the lever 21 will exert a constant load on it when weights 33 are applied to the lever arm. The worm 98 on the extensometer is now connected by the flexible couplings 99 and 104 to the operating motor 50 and to the meter 52, and the contact points 94 and 95 on the micrometer are electrically connected in the circuit of the tube E for use during the testing operation, as illustrated in Fig. 13. The furnace 41 is lowered to enclose the test specimen, the furnace plugs 41a and 41b are inserted in the top and bottom of the furnace, and the furnace is electrically connected to its controller 44.

The loading for the test is now applied by placing one of the weights 33 on the rod 32. At this point the master switch MS and the up direction switch U are closed. The reading of the meter 52 should be noted by the attendant for record purposes. It will be assumed now that the furnace is up to its constant desired temperature, and that additional weights 33 are added to the rod 32 from time to time, with a reading of the meter taken at each time, until the predetermined constant load on the specimen is reached.

It will be assumed now that as time passes, the test specimen deforms or stretches under the constant predetermined load. The stretching of the test specimen exerts a pull on the pin 69, the plate 67, the comparison rods 55 and 56 and the plate 59. This causes the plate 59 to move relatively to the plate 60 on which the comparison rods 57 and 58 are mounted.

The separating motion of the plates 59 and 60 causes the contact 95, mounted on the plate 59, to leave the contact 94 on the upper portion of the micrometer, thus opening the circuit associated with the control tube E, which changes the potential on the control grid 107 to the same potential that exists on the cathode 108, and this, in turn, causes the tube to start "firing." The operation of the tube E energizes the relay C, which thereupon, closes its contact C1 and thus energizes the field winding F1 and the armature A of the motor 50 to start the motor in operation to screw the micrometer upwardly. The operation of the motor rotates the worm 98, which causes rotation of the worm wheel 100, the gear wheels 102 and 103 and the micrometer 62.

The operation of the worm 98 also operates the meter 52 and it registers the number of turns being made by the worm.

It will be assumed now that the micrometer has been screwed upwardly to the position where its contact 94 re-engages the contact 95 of the upper plate 59. This engagement again restores the circuit from the tube filament 109 through the conductor 110, contacts 94 and 95 and conductor 111 to a point midway between the resistors R3 and R4 in the circuit of the control grid 107, thereby unbalancing the bias to the control grid 107 and thus causing the tube to cease firing. As the tube ceases firing it deenergizes the relay C, which opens its contacts C1 and thus deenergizes and stops the motor 50, The stopping of the motor stops further operation of the micrometer and the counting meter 52. If desired, a reading of the meter 52 may be made at this time in connection with the time which has expired since the last previous reading.

When the specimen elongates further as the test is continued, the contacts 94 and 95 will again separate and thus start the motor to screw the micrometer upwardly and operate the meter until the contacts close and stop the motor, and this operation will be repeated automatically time after time. In this manner, the micrometer follows up the creep of the specimen until the test is terminated.

The extensometer illustrated in Figs. 3 and 4 may be used for creep-to-rupture tests, but it may be readily modified as shown in Figure 8 so that it will be much more sensitive to the deformation of the test specimen. In the modified form, the upper comparison rods 55e and 56e are attached to a plate 67e by a pair of cap screws 65e and 66e and the plate is supported by a pair of rods 114 and 115 from a pair of blocks 116 and 117 which are clamped around the upper portion of the test specimen by a pair of bolts 118 and 119. The lower ends of the rods 114 and 115 pass through the plate 67e and are bent over and spot welded to the plate. The upper ends of the rods are bent at right angles to their bodies to extend over and are spot welded to the clamping block 116, so that when the clamps are tightened on the test specimen, the plate 67e and the upper comparison rods will be suspended from the upper portion of the test specimen.

The lower comparison rods are attached in the same manner to the plate 74e which is attached by bent rods 120 and 121 to a clamp 122 fastened around the lower portion of the test specimen, so that the lower comparison rods 57e and 58e will be attached to the lower ends of the specimen in the same manner as the upper comparison rods are attached to the upper portion of the specimen.

The lower ends of the upper comparison rods 55e and 56e are attached to a plate 59e and the lower ends of the comparison rods 57e and 58e are attached to the lower plate 60e in the same manner as in the device illustrated in Figs. 3 and 4. The plates 59e and 60e (Fig. 9) are cut away at the points 81e and 82e to permit them to be moved into operating position adjacent to the lower grip 36 when a test is to be made, and a stiff wire 83e is bent around the grip 36 and back of the nuts on the ends of the lower comparison rods to hold the plates in their operating position and prevent them from swinging away from the specimen grip.

When the test specimen elongates, the movement of the upper comparison rods with reference to the lower comparison rods will move the upper plate 59e relative to the plate 60e. In order to make use of this relative movement in securing a sensitive indication of the deformation of the specimen under test, we have mounted a magnifying arm 124 between the upper plate 59e and an auxiliary plate 125 seated on the lower plate 60e by means of a double cross-spring pivot or leverage device 126 which serves both to magnify the motion and maintain the alignment of the plates. The pivot is very rugged and allows considerable mishandling without changing the calibration of the lever arm. However, because of limited travel of the lever arm, it is not adapted for testing specimens to rupture.

The plate 125 is mounted at its one end on the plate 60e by means of a plurality of bolts 127 and sleeves 128 and at its other end by means of a plurality of sleeves 129 disposed on the lower ends of the lower comparison rods and seated on the plate 60e. The pivotal leverage device is of the frictionless type embodying a pair of leaf type springs 131 and 131a (Figs. 11 and 12) having their upper ends attached to the inner side of a block 132 mounted on the under side of the plate 125 and their lower ends attached to the adjacent side of a leverage block 133, a pair of leaf springs 135 and 135a having their upper ends attached to the inner side of a block 136 and their lower ends attached to the adjacent side of the leverage block 133, and a single broad leaf spring 138 having its central portion attached to the upper face of the leverage block 133 by a plurality of bolts 134 and its ends attached, respectively, to the under sides of the blocks 132 and 136. The fulcrum end of the lever arm 124 is mounted on the under side of the leverage block 133 under the nuts on the bolts 134 and its free end is provided with a contact grip 139 for holding the contact 95e. The block 136 extends upwardly through a rectangular hole 137 in the plate 125 to a point where it is attached by a plurality of screws 140 to the upper plate 59e mounted on the lower ends of the upper comparison rods.

The leaf springs and the manner in which they are attached to the blocks provide a leverage device having a frictionless fulcrum for the magnifying arm by means of which the relative movement of the plate 60e connected with the lower comparison rods and the plate 59e connected with the upper comparison rods may be magnified in accordance with the length of the arm.

The contact member 95e on the outer end of the magnifying arm 124 is disposed in position to be engaged by the contact 94e on the micrometer 62e, which is mounted on the plate 60e by means of an extension plate 142 mounted on the other side of 60e.

The micrometer 62e is connected to the motor and the counting meter in the same manner as the micrometer shown in Fig. 3. The contact members 94e and 95e are connected in the control circuit illustrated in Fig. 13 in the same manner as the contact members 94 and 95 are associated with that circuit.

A screw threaded member with a knurled head 143 is disposed in the right-hand end of the plate 125 in position to be turned up against the upper plate 59e for the purpose of setting the plates at a fixed distance apart when the extensometer is being assembled on the test specimen. This member is removed after the specimen is assembled.

The operation of the "sensitive" or modified form of the extensometer illustrated in Fig. 8, is essentially the same as that described for the form illustrated in Figs. 3 and 4, except that movement of the plate 59e relative to the plate 60e and the plate 125 causes a magnified movement of the outer end of the lever arm 124 to lift the contact 95e away from the contact 94e. This is effected because when the plate 59e moves away from the plate 125, it pulls upwardly on the block 136 which in turn pulls upwardly on the springs 135 and 135a as well as on the one end of the horizontal spring 138, thus tilting the magnifying lever 124 around the axis provided by the horizontal spring 138 and the vertical springs 131 and 131a. The length of the lever 124 magnifies the action of the plate 59e relative to the plate 125 and renders the instrument much more sensitive to deformation or stretch of the specimen so that the contacts 95e and 94e separate upon a deforming action in the specimen in this form of the instrument more than they do in the form of the instrument shown in Figs. 3 and 4. The separation of the contacts 95e and 94e causes the motor to operate the worm and gears for operating the micrometer and the meter in the same manner as previously described.

Referring now to Fig. 14, where it is desirable, the gear operated micrometer and its operating gears and the meter 52 may be removed from the extensometer, and a hand-operated micrometer 62g substituted therefor. The hand-operated micrometer may be provided with a contact 94g disposed to engage the contact 95g on the magnifying lever 124g. When a hand-operated micrometer is used, the up direction switch U and the down switch D are opened to prevent operation of the motor 50, and an indicating or signal device such as a lamp 141 is provided for indicating to the test attendant when the contacts 94e and 95e separate. The signal lamp is provided with a circuit which may be connected to the control circuit by a manually operated switch H.

The operation of the contacts 95g and 94g by the mechanism illustrated in Fig. 14, is the same as that described in connection with the mechanism in Fig. 8. However, in operating the mechanism by use of the manually controlled micrometer 62g, the up and down direction switches U and D in the control system are opened and the auxiliary switch H is closed, so that when the contacts 94g and 95g separate, their separation in the control system will cause the control tube E to energize the control relay C to close its contacts C1 and thereby light the signal lamp 145 to indicate to the test attendant that the micrometer should be operated to close the contacts 95e and 94e. Inasmuch as there is no gear mechanism or counting meter associated with the manually operated micrometer in Fig. 14, the desired readings will be taken from the micrometer itself. The micrometer bears the usual micrometer scale and the readings may be readily taken at any time or at predetermined intervals during the test.

By the foregoing descriptions, it will be seen that we have provided a simple and inexpensive testing machine; that the extensometer and its modifications included therein are simply arranged and may be easily and quickly applied to test specimens; that readings of data resulting from the tests may be carried out at any desired time. It will also be evident that the various parts of the extensometer described, may be readily interchanged to suit many conditions. For instance, the magnifying lever arrangement, shown in Fig. 8, may be readily substituted for the direct-operated contacts shown on the device illustrated in Fig. 3, or the manually operated micrometer, shown in Fig. 14 may be readily substituted for the gear operated micrometer in either Figs. 3 or 8. Further, it will be understood that the pin attaching means, shown in Fig. 3, and the clamp attaching means, shown in Fig. 8, are readily interchangeable, and, if desired, that the clamping means may be used on one end of the specimen while the pin attaching means is used on the other end of the specimen.

From the foregoing description and illustration of our testing machine, it will also be evident that other modifications thereof and changes therein may be made without departing from the spirit and scope of our invention.

We claim as our invention:

1. In an extensometer for indicating the change in dimension of a specimen subject to a load, the combination of, a specimen loading rod means connected to one end of said specimen and lying substantially coaxially of said specimen, a first plate having a notch therein, a second plate having a notch therein, means connecting said first and second plates, respectively, at spaced points on said specimen and supporting said plates in axially spaced relation along said rod means and at right angles thereto with the notch in each plate engaging said rod means, means connected with one of said plates and slidably engaging said rod means on the side thereof opposite said notch for preventing movement of said one plate in a direction to disengage the notch in said one plate from said rod means, and means responsive to relative movement of said plates axially of said rod means.

2. In an extensometer for indicating the change in dimension of a specimen subject to a load, the combination of rod means connected to the ends of said specimen for applying an axial load thereto, said rod means being arranged substantially coaxially of said specimen, a first plate having a notch therein for receiving said rod means, a second plate having a notch therein for receiving said rod means, first support means connected at a first point on said specimen and connected with said first plate, supporting said first plate at right angles to said rod means with said rod means engaging the sides of the notch in said first plate; second support means connected at a second point on said specimen removed from said first point and connected with said second plate, supporting said second plate at right angles to said rod means in spaced relation with said first plate and with the notch in said second plate in engagement with said rod means; resilient means connecting said first and said second plates together preventing relative movement of said plates transversely of said rod means and permitting relative movement of said first and said second plates axially of said rod means, means connected with at least one of said plates and slidably engaging said rod means on the side thereof opposite said notch for preventing transverse movement of said one plate with respect to said rod means in a direction to disengage said rod means from the notch in said one plate, and means responsive to relative movement of said first plate and said second plate axially of said rod means.

3. In an extensometer for indicating the change in dimension of a specimen subject to a load, the combination of rod means connected to the ends of said specimen for applying an axial load thereto, said rod means being arranged substantially coaxially of said specimen, a first plate having a notch therein for receiving said rod means, a second plate having a notch therein for receiving said rod means, first support means connected at a first point on said specimen and connected with said first plate, supporting said first plate at right angles to said rod means with said rod means engaging the sides of the notch in said first plate; second support means connected at a second point on said specimen removed from said first point and connected with said second plate, supporting said second plate at right angles to said rod means in spaced relation with said first plate and with the notch in said second plate in engagement with said rod means; a first flat spring member connected to said first plate adjacent an edge and projecting therefrom substantially in the plane of said first plate, a second flat spring member connected to said second plate adjacent an edge thereof and projecting therefrom in the same direction as said first flat spring member, means rigidly connecting together the free extremities of said flat spring members, means connected with at least one of said plates and slidably engaging said rod means on the side thereof opposite said notch for preventing transverse movement of said one plate with respect to said rod means in a direction to disengage said rod means from the notch in said one plate, and means responsive to relative movement of said first plate and said second plate axially of said rod means.

4. In an extensometer for indicating the change in dimension of a specimen subject to a load, the combination of, a specimen loading rod connected to one end of said specimen and lying substantially coaxially of said specimen, a first plate having a notch therein, a second plate having a notch therein, means connecting said first and second plates, respectively, at spaced points on said specimen and supporting said plates in axially spaced relation along said rod means and at right angles thereto with the notch in each plate engaging said rod means, means connected with one of said plates and slidably engaging said rod means on the side thereof opposite said notch for preventing movement of said one plate in a direction to disengage the notch in said one plate from said rod means, a first flat spring member connected to said first plate adjacent an edge and projecting therefrom substantially in the plane of said first plate, a second flat spring member connected to said second plate adjacent an edge thereof and projecting therefrom in the same direction as said first flat spring member, means rigidly connecting together the free extremities of said flat spring members, and means responsive to relative movement of said plates axially of said rod means.

5. In an extensometer for indicating the change in dimension of a specimen subject to a load, the combination of, a specimen loading rod connected to one end of said specimen and lying substantially coaxially of said specimen, a first plate having a notch therein, a second plate having a notch therein, means connecting said first and second plates, respectively, at spaced points on said specimen and supporting said plates in axially spaced relation along said rod means and at right angles thereto with the notch in each plate engaging said rod means, means connected with one of said plates and slidably engaging said rod means on the side thereof opposite said notch for preventing movement of said one plate in a direction to disengage the notch in said one plate from said rod means, a first projection extending from said first plate axially of said rod means, a second projection extending from said second plate axially of said rod in spaced relation with said first projection and having the extremity thereof substantially in the same plane as the extremity of said first projection, a flat spring connecting the extremities of the first and second projections, a block secured substantially centrally of said flat spring, a flat spring connected at one end with a side of said block at right angles to the side thereof connected to said first mentioned flat spring and at the other end thereof connected to a side of said first projection, a second flat spring connected at one end to a side of said block opposite the side thereof to which said second mentioned flat spring is connected and connected at the other end thereof to a side of said second projection, and means responsive to angular movements of said block.

6. Apparatus as set forth in claim 5 in which said last named means comprises an arm connected at one end to said block and projecting therefrom so that the free extremity of said arm is moved by rotative movements of said block, and adjustable means disposed in a position to engage the free extremity of said arm and affording adjustment to follow the movements of said free extremity.

MICHAEL J. MANJOINE.
EVAN A. DAVIS.

REFERENCES CITED

The following references are of record in the file of this patent:

UNITED STATES PATENTS

| Number | Name | Date |
|---|---|---|
| 575,651 | Kidwell | Jan. 19, 1897 |
| 1,140,271 | Cato | May 18, 1915 |
| 1,893,098 | Murray, Sr., et al. | Jan. 3, 1933 |
| 2,043,953 | Harrall, et al. | June 9, 1936 |
| 2,077,598 | Heydekampf | Apr. 20, 1937 |
| 2,154,280 | Nadai, et al. | Apr. 11, 1939 |
| 2,176,016 | Sivertsen | Apr. 11, 1939 |
| 2,204,792 | Davis | June 18, 1940 |
| 2,220,164 | List | Nov. 5, 1940 |
| 2,301,872 | Henderson | Nov. 10, 1942 |
| 2,331,779 | Hjarpe, et al. | Oct. 12, 1943 |

FOREIGN PATENTS

| Number | Country | Date |
|---|---|---|
| 16,837 | Great Britain | Aug. 11, 1908 |